United States Patent
Nair

(10) Patent No.: US 11,711,361 B2
(45) Date of Patent: Jul. 25, 2023

(54) BIOMETRIC AUTHENTICATION DURING VOICE DATA TRANSFERS

(71) Applicant: PAYPAL, INC., San Jose, CA (US)

(72) Inventor: Rahul Nair, Leander, TX (US)

(73) Assignee: PAYPAL, INC., San Jose, CA (US)

( * ) Notice: Subject to any disclaimer, the term of this patent is extended or adjusted under 35 U.S.C. 154(b) by 959 days.

(21) Appl. No.: 16/431,670

(22) Filed: Jun. 4, 2019

(65) Prior Publication Data

US 2020/0389451 A1 Dec. 10, 2020

(51) Int. Cl.
| | |
|---|---|
| *H04L 9/40* | (2022.01) |
| *G06F 21/32* | (2013.01) |
| *G06F 21/34* | (2013.01) |
| *H04M 3/493* | (2006.01) |
| *G10L 15/22* | (2006.01) |
| *G06Q 20/40* | (2012.01) |

(52) U.S. Cl.
CPC .......... *H04L 63/0861* (2013.01); *G06F 21/32* (2013.01); *G06F 21/34* (2013.01); *G06Q 20/40145* (2013.01); *G10L 15/22* (2013.01); *H04M 3/4936* (2013.01); *G10L 2015/223* (2013.01)

(58) Field of Classification Search
CPC ... G06F 21/32; G06F 21/34; G06Q 20/40145; G06Q 20/4014; G10L 15/22; G10L 2015/223; H04M 3/4936; H04M 2203/6054; H04M 3/493; H04L 63/0861
See application file for complete search history.

(56) References Cited

U.S. PATENT DOCUMENTS

| | | | | |
|---|---|---|---|---|
| 8,478,989 | B2* | 7/2013 | Lynch | H04L 63/0807 |
| | | | | 726/20 |
| 10,659,451 | B2* | 5/2020 | Kurian | H04L 63/10 |
| 10,693,644 | B2* | 6/2020 | Kozma | H04L 9/3213 |
| 10,839,392 | B2* | 11/2020 | Nicoletti | G06Q 20/305 |
| 11,086,980 | B2* | 8/2021 | Le Saint | H04L 9/0822 |
| 11,356,259 | B1* | 6/2022 | Agnew | H04L 9/3213 |
| 2018/0121642 | A1* | 5/2018 | Cooper | G06F 21/32 |
| 2019/0068594 | A1* | 2/2019 | Sarwar | H04L 9/3231 |
| 2020/0389451 | A1* | 12/2020 | Nair | G06F 21/34 |

* cited by examiner

*Primary Examiner* — Huan V Doan
(74) *Attorney, Agent, or Firm* — Haynes and Boone, LLP

(57) ABSTRACT

There are provided systems and methods for biometric authentication during voice data transfers. A user may initiate voice communications with a service provider endpoint that provides automated services to the user through the voice or audio communications, such as an interactive voice response (IVR) system where a user may navigate menus through audio commands. The user may by required to authenticate their identity during the phone call or other voice data transfer, which may be done by entering a biometric, such as a fingerprint. The biometric may be converted to biometric feature data and provided to one or more token service providers. The token service providers may provide one or more tokens for the biometric, which may be used as the authentication token. This token may then be transmitted to the IVR system through the user's endpoint using a dialer feature of the endpoint.

20 Claims, 6 Drawing Sheets

BIOMETRIC AUTHENTICATION DURING VOICE DATA TRANSFERS

TECHNICAL FIELD

The present application generally relates to biometric authentication during voice data transfers and calls and more specifically to converting a biometric input of received from an entity to an authentication code or token that may be shared during a voice data transfer to authenticate that entity.

BACKGROUND

Various types of service providers may provide services to entities using voice communication systems, such as interactive voice response (IVR) systems. For example, a service provider may provide a call-in service to users that allows the users to interact with the service provider through a phone call or other voice data transfer medium, such as voice over IP or LTE (VoIP or VoLTE) or other data transfer that allows audio or audiovisual content to be transferred between two or more endpoints. During use of a voice communication system with a service provider's endpoint, the user may be required to authenticate an identity of the user or secure account credentials. For example, a user may have an online account with the service provider and store sensitive information (e.g., personal and/or financial information) with the accounts and platforms. If another user gains access to this account, then the user risks exposure of this sensitive information and may lead to theft and abuse of this information. Thus, the voice communication system of the service provider may be required to identify and authenticate the user during the voice data transfer. Previous systems may allow a user to use a phone keypad to enter a series of numbers that are known only to the user. However, this is time consuming and includes similar risks to passwords and personal identification number (PIN) authentication systems. For example, the authentication code may be stolen and used by others through brute force attacks, phishing schemes, and other malicious acts. Thus, the authentication systems may risk compromising a user's identity, account, and/or sensitive information.

Figure 1:
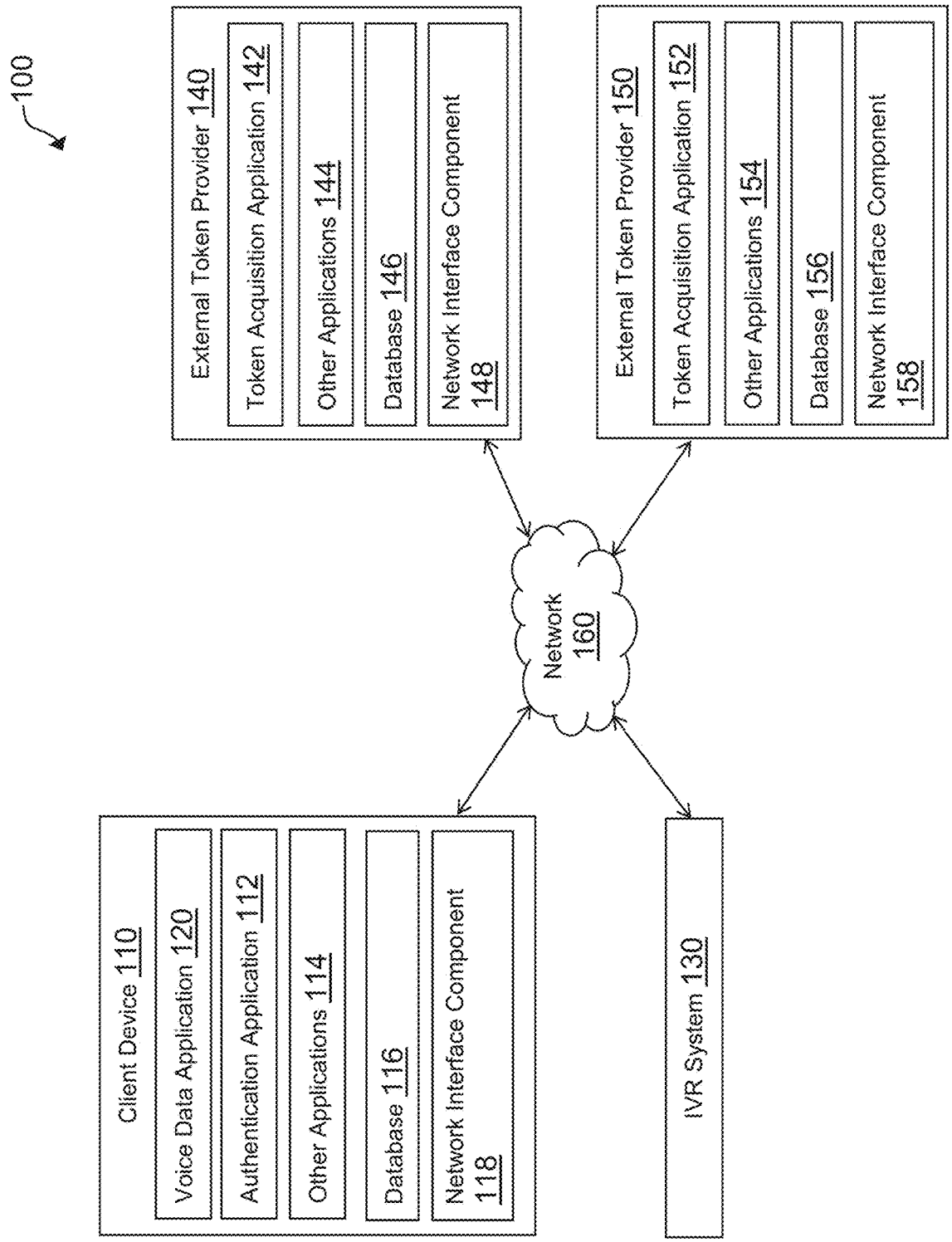
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for biometric authentication during voice data transfers. Systems suitable for practicing methods of the present disclosure are also provided.

A service provider may provide biometric authentication processes with a user during voice data transfers with live or automated endpoints. This may be provided through an application and/or executable processes on the user's endpoint or endpoint device (e.g., mobile smart phone or other computing device) that converts biometric input to an authentication token. In this regard, the service provider may utilize one or more disparate token service providers and databases that store the authentication token or partial data of the authentication token, where the token data may be looked up and retrieved using feature data or raw data of the biometric (e.g., data converted or translated from the biometric into data that can be stored and referenced in one or more database tables). Once the token data is retrieved by the user's endpoint from the token service provider during the voice data transfer using the biometric, the user's endpoint may feed the token to the other endpoint during the transfer, such as an interactive voice response (IVR) system through a dialer module, application, or process. The authentication token may then be used to authenticate an identity of the user and/or access an account, which may allow the user to perform additional processes based on a heightened trust or security with the service provider from the authentication. This may allow the user to access sensitive information, perform processes including payment processes and/or account maintenance (e.g., changing account information including credentials for the account), and/or process other data that may require or be provided once a user is trusted and authenticated.

In order to provide these biometric authentication processes during voice data transfers, the user may first be required to establish an account with the service provider, token service provider(s), and/or other online platform, or otherwise store the user's biometric with token data in one or more databases of the token service provider(s). Thus, the service provider and/or token service provider may provide an account, account management, and/or additional services, including electronic transaction processing for online transactions with merchants and service providers through digital accounts. During creation of the account, the user may be required to provide identification information to establish the account, such as personal information for a user, business or merchant information for such an entity, or other types of identification information including a name, address, and/or other information. The user may also be required to provide financial information, including payment card (e.g., credit/debit card) information, bank account information, gift card information, and/or benefits/incentives, which may be used to provide funds to the account and/or an instrument for transaction processing. The user may also be required to select an account name and/or provide authentication credentials, such as a password, personal identification number (PIN), answers to security questions, and/or other authentication information. Such information may also include information to establish an authentication token during IVR system use or other voice communications, such as an alphanumeric code used for authentication during the voice communications with an automated system. The user may also provide a biometric for association with the authentication token, which may include a fingerprint, voice pattern or speech, facial image, retinal scan or image, heart rate or rhythm, or other biometric input. The biometric input may be converted to raw biometric data, such as feature data of the biometric (e.g., fingerprint lines, contours, points, or other data that may be extracted from a biometric). However, not all information may be necessary in all embodiments and/or the authentication token may be generated by the service provider and/or token service providers without entry of a code by the user so that the authentication token's data is not revealed to the user and/or other parties or is randomly generated for the user. In some embodiments, only the biometric and biometric feature data may be stored, and the authentication token may be randomly generated for each instance or for specific time periods for authentication during voice communications.

The user's account may then be used by the user to perform online interactions and activities. In some embodiments, this may include electronic transaction processing, messaging, social networking, content access, etc. In various embodiments, a website may provide the online services, and thus may be accessed by a web browser application through the account. The application (or website) may be associated with a payment provider, such as PayPal® or other online payment provider service, which may provide payments and the other aforementioned transaction processing services on behalf of users, merchants, and other entities. In some embodiments, a dedicated application may also be utilized to access the account and perform online interactions. The account may also be accessed through voice communications with a system of the service provider, such as an IVR system. Thus, an account of a first user may include sensitive information, including personal information, financial information, and/or authentication information, which requires authentication by a user to use, access, and/or maintain the account during voice communications with a service provider system.

After account setup, the user may wish to establish or authorize biometric authentication for the account and/or the identity of the user during voice communications. The user may previously provide the biometric used for authentication during account setup or when authorizing the biometric for voice communications. As previously discussed, the biometric may correspond to a fingerprint, which may be converted to fingerprint feature data. However, other biometrics, such as eye/retinal scans, voice patterns, facial/body images, or other types of biometrics, may also be converted. The service provider receiving the biometric authentication may then generate an authentication token and/or interact with token service provider(s) to generate the authentication token. For example, the service provider may cause generation of an authentication token with one or more token service providers. Where multiple token service providers are utilized, each token service provider may generate partial data for the authentication token, such as a portion of an alphanumeric code used for authentication during voice communications. In some embodiments, the service provider may include a token service provider that generates and stores the authentication token or partial data for the token service provider. Once the data for the authentication token is generated, the authentication token data may be stored by the token service provider(s) with the biometric and/or feature data for the biometric. Where multiple token service providers are used to generate partial data for the authentication token, each token service provider may store their respective partial data that the token service provider generated with the biometric and/or biometric feature data.

The user's endpoint device, such as a mobile phone or other computing device, may implement an application, operating system process, and/or application add-on or plug in process to perform biometric authentication during voice data transfers. The application and/or process may be utilized to request the user's biometric during a voice data transfer with another data endpoint, such as an automated endpoint device or server of one or more service providers that provides IVR services to users through voice and/or audio commands. The user may initiate a call using the application and/or another voice communication application on the user's device to the IVR system or other voice communication endpoint. For example, a publicly switched telephone network (PSTN) may be used to make a voice call to an IVR system that accepts voice or audio inputs (e.g., through a dialer module or component of the device). During the voice or audio data transfer, authentication may be required, which may trigger the application or process on the user's endpoint to request biometric authentication from the user. For example, establishment of the voice/audio data transfer may immediately trigger an authentication request based on the endpoint identifier, detection of the IVR system, preference set by the user, or other data detected for establishment of the data transfer. Thus, the user may be requested to enter the biometric at the beginning of the data transfer or before any sensitive data or access is provided. In other embodiments, during the data transfer a specific trigger may cause the application or process to request the biometric for the user for authentication. For example, the user may enter a flow or select a menu option that requires the user to authenticate their identity and/or provides the user access to the account. The flow or menu option may be to access confidential information or perform a process that risks data, monetary value, or other sensitive items to the user and/or service provider. The flow or menu option may include voice data or a sound that activates the biometric authentication request. In other embodiments, the flow or data may trigger an application with the service provider to interface, over a network or the voice data transfer, with the application or process on the user's endpoint device to request the biometric. Once the biometric authentication request is activated, the request may be output to the user and a field or process may allow for entry of the biometric.

For example, the user may enter the biometric to a field on an interface, camera, or a fingerprint scanner of the user's endpoint device. A camera and/or microphone may also record or capture the biometric. Once the biometric is captured by the user's device, the biometric may be converted to feature or raw data that is used to determine whether the biometric matches the stored biometric by the one or more token service providers. For example, the user's device may convert the biometric to feature data of the biometric, which may then be sent to the token service provider(s) for analysis and determination of the stored authentication token or partial data of the authentication token by looking up the token data using the feature data. In some embodiments, the user's device may determine whether the biometric matches a stored biometric on the user's device and authenticates the user so that the authentication token may be received and/or determined from the one or more token service providers. However, in other embodiments, the token service providers may receive the biometric and perform the analysis to determine the biometric feature data and authenticate the user.

Each token service provider may be accessed through an external application programming interface (API) that may interact with the user's endpoint device (e.g., by sending and receiving API calls for data). Additionally, each token service provider includes a token database that stores the biometric data or feature data with the authentication token or partial data of the authentication token. Thus, when the user's device performs an API call to the token service provider to retrieve token data from the token service provider's database using the biometric data or biometric feature data, the token service provider may respond with token data for the authentication token (e.g., either the full authentication token or partial data of the authentication token). For example, where one token service provider is utilized, the API call may be to the external API of the token service provider, which may respond with the authentication token. If the biometric feature data does not match any stored data, the biometric may be considered unknown and the user may not be authenticated by the token service provider(s) for retrieval of authentication token data or partial data. The user may be required to reenter a biometric or the user may be refused authentication during the voice data transfer with the automated calling system.

However, where multiple token services providers are utilized, multiple API calls may be made to each token service providers' external API, which respond with partial data for the authentication token. The returned data may correspond to digits or alphanumeric strings that may be entered to a phone through a dialer component or process. In other embodiments, different data may be returned, which may be entered through different device components. Thus, the same fingerprint or other biometric may be used to generate different tokens or other data. The returned token(s) may be dynamic such that they are flipped, cycled, or otherwise changes in certain time intervals, such as periodically or generate per request. For example, specific audio-visual content maybe returned that may allow for authentication through database matching or lookup tables, which may vary depending on the authentication session. Thus, each service provider may have a separate or coordinated process to generate and provide tokens based on the token request or depending on the user/entity requiring the authentication.

The user's device then receives the partial data and executes an agreed upon algorithm with the service provider to perform a combination or "mashup" of the partial data in a specific manner that generates the authentication token. The mashup algorithm or process to combine the data may be known only to the application/process on the user's endpoint device and the service provider/token service providers that provide biometric authentication. Thus, the authentication token and the partial data may be determined through the algorithm and a reverse algorithm that extracts the partial data for each token service provider from the authentication token.

Once the authentication token is determined by the user's endpoint device, the application or process on the user's device that performs authentication during the voice data transfer may feed the authentication token to the other endpoint through voice or audio communications. For example, the application or process may relay an audio tone corresponding to the authentication token or may utilize a text-to-speech process to audibly communicate the token to the other endpoint. The token may be transmitted using a dialer application or component on the user's device, for example, by automatically entering digits from a phone dialer. In other embodiments, the token may be transmitted silently, for example, using inaudible tones or data (e.g., binary bits) transmitted over the voice data transfer). The token may also be transmitted over another communication channel, such as a network, to the IVR system or service provider for authentication.

The IVR system and/or service provider may receive the authentication token and determine if the authentication token matches the expected value or data for the authentication token based on the data from the one or more token service provider(s). For example, where one token service provider is used, the IVR system and/or service provider may compare the authentication token received from the user's endpoint device to the token from the token service provider and authenticate the user if the data matches. In other embodiments where multiple token service providers are used, the algorithm used to generate and combine the partial token data from each token service provider by the user's device may be used to split or extract the partial data from the received authentication token. Each token service provider may then be called to compare the partial data with each token service provider and authenticate the user. If the data matches, the user's device and user may be authenticated during the voice data transfer. Thus, the user may be "stepped-up" or allowed to perform further operations and access further data during the voice data transfer.

In this manner, a voice communication system of a service provider or integrated with a service provider may utilize biometric authentication during voice data transfers that normally only accept input of voice commands or selection of digits using a dialer module. Biometric authentication is generally preferable as biometrics are more difficult to simulate and/or misappropriate by malicious parties. Since biometric authentication provides increased security during authentication, the service provider may provide increased benefits and security to automated voice communication systems through the use of biometric authentication. This also allows computing devices and IVR systems to provide biometric authentication without changing existing infrastructure or components on the computing devices or the IVR systems.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a client device 110, an IVR system 130, an external token provider 140, and an external token provider 150 in communication over a network 160. Client device 110 may be utilized by a user to access the various features available for client device 110, which may include processes and/or applications associated with IVR system 130 to establish a voice data transfer, such as use of an IVR interface and system that allows automated operations with a service provider associated with IVR system 130 (e.g., a merchant, payment provider, or other service platform). During use of IVR system 130, IVR system 130 may request authentication, which may be granted through entry of a biometric to client device 110. Client device 110 may interact with external token providers 140 and 150 to receive authentication token data using the biometric, which may be fed to IVR system 130 during the voice data transfer to authenticate the user.

Client device 110, IVR system 130, external token provider 140, and external token provider 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Client device 110 may be implemented as a communication device that may utilize appropriate hardware and software configured for wired and/or wireless communication with second user device 130, IVR system 130, and/or account usage platform 160. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Client device 110 of FIG. 1 contains a voice data application 120, a authentication application 112, other applications 114, a database 116, and a network interface component 118. Voice data application 120, authentication application 112, and other applications 114 may correspond to executable processes, procedures, and/or applications with associated hardware. In other embodiments, client device 110 may include additional or different modules having specialized hardware and/or software as required.

Voice data application 120 may correspond to one or more processes to execute modules and associated devices of client device 110 to interact with IVR system 130 to establish a voice data transfer and perform voice and audio communications with another endpoint, as well as provide or feed an authentication token over the voice communications or another communication channel to the other endpoint. In this regard, voice data application 120 may correspond to specialized hardware and/or software utilized by client device 110 to first establish a voice data transfer, such as a phone call to another endpoint. Voice data application 120 may include or interface with a dialer process, component, and/or application to establish the voice data transfer, for example, by receiving digit or identifier input of another endpoint, selection of a contact name and/or identifier, or otherwise providing information necessary to establish a data transfer with the other endpoint. Once the voice data transfer is established, data may be transferred between client device 110 and the other endpoint, such as IVR system 130.

Such data may include exchange of an authentication request and an authentication token in response to the authentication request. For example, IVR system 130 may trigger a request for authentication during the voice data transfer, or voice data application 120 and/or authentication application 112 may detect the voice data transfer and determine authentication is required. Voice data application 120 may also receive an authentication request from IVR system 130 during the voice data transfer, such as voice, audio, or other data received over network 160 during the voice data transfer. Once the authentication request is received, authentication application 112 may be used to process a biometric, determine an authentication token, and process the authentication request using the authentication token. In some embodiments, voice data application 112 may be used to feed the authentication token to IVR system 130 during the voice data transfer, for example, by utilizing a dialer module, component, and/or process of client device 110 and/or voice data application 120 to input the authentication token as an alphanumeric code during the voice data transfer as tones, data, or other information that is transmitted to IVR system 130.

Voice data application 120 and/or authentication application 112 may be used to display account information for an account used by client device 110 during the voice data transfer. Once authenticated and logged in to the account, voice data application 120 may be used to perform actions and/or interactions with IVR system 130 using the account, for example, by accessing account data, using the account for a process (e.g., electronic transaction processing), and/or maintaining or changing account data. Voice data application 120 may correspond to a general browser application configured to retrieve, present, and communicate information over the Internet (e.g., utilize resources on the World Wide Web) or a private network. For example, voice data application 120 may provide a web browser, which may send and receive information over network 160, including retrieving website information, presenting the website information to the user, and/or communicating information to the website. However, in other embodiments, voice data application 120 may include a dedicated application of client device 110 and/or IVR system 130 or other entity (e.g., payment provider, etc.), which may be configured to provide voice communication services, such as telephonic services.

Authentication application 112 may correspond to one or more processes to execute modules and associated devices of client device 110 to authenticate a user during a voice data transfer using voice data application 120 using a biometric and determine an authentication token to authenticate the user to IVR system 130 based on the biometric. In this regard, voice data application 120 may correspond to specialized hardware and/or software utilized by client device 110 to first determine that voice data application 120 requires authentication of a user of client device 110 during a voice data transfer with IVR system 130. Once determined, authentication application 112 may populate an authentication request and/or input request for a user biometric, such as a fingerprint, voice sample, facial and/or body image, retinal scan, heart rhythm, or other user biometric. Authentication application 112 may capture the biometric using a sensor of client device 110, such as a touch screen, scanner, fingerprint input device, camera, microphone, and/or other type of biometric sensor.

Authentication application 112 may then process the biometric to determine an authentication token. External token provider 140 and/or external token provider 150 may be used to determine the authentication token based on stored biometric data and/or biometric feature data, as well as token databases and processes to provide digital tokens for authentication. In some embodiments, authentication application 112 may convert the biometric to raw data, such as feature data of the biometric that converts the biometric to processable data used to lookup or determine authentication token data using external token providers 140 and 150. However, in other embodiments, the biometric may be sent to external token providers 140 and 150 for processing and determination of authentication token data. Authentication application 112 may receive authentication token data from external token providers 140 and 150 based on the biometric feature data. In some embodiments, a single token may be received from one or more of external token providers 140 and 150, which may correspond to the authentication token. However, in other embodiments, partial token data for the authentication token may be received from both of external token providers 140 and 150, which may be combined, mashed up, or otherwise processed using an algorithm to determine the authentication token by authentication application 112. The authentication token may then be provided to voice data application 120 to authenticate the user during the voice data transfer. This may be done by hiding or obscuring authentication information so that the sensitive biometric and/or login information is not revealed on client device 110 and/or to IVR system 130 and instead the authentication token is used to authenticate the user.

Although voice data application 120 and authentication application 112 are shown as separate applications, in some embodiments, one or more of the functions of voice data application 120 and authentication application 112 may be incorporated in the same application to provide their respective functionalities in a common application.

In various embodiments, client device 110 includes other applications 114 as may be desired in particular embodiments to provide features to client device 110. For example, other applications 114 may include security applications for implementing client-side security features, programmatic client applications for interfacing with appropriate application programming interfaces (APIs) over network 160, or other types of applications. Other applications 114 may also include additional communication applications, such as email, texting, voice, social networking, and IM applications that allow a user to send and receive emails, calls, texts, and other notifications through network 160. Other applications 114 may be utilized with authentication application 112 to perform a login to an account Other applications 114 may include device interfaces and other display modules that may receive input and/or output information. For example, other applications 114 may contain software programs, executable by a processor, including a graphical user interface (GUI) configured to provide an interface to the user.

Client device 110 may further include database 116 stored in a transitory and/or non-transitory memory of client device 110, which may store various applications and data and be utilized during execution of various modules of client device 110. Thus, database 116 may include, for example, identifiers (IDs) such as operating system registry entries, cookies associated with voice data application 120 and/or other applications 114, IDs associated with hardware of client device 110, or other appropriate IDs, such as IDs used for payment/user/device authentication or identification. Database 116 may include data for voice data transfers, such as communication endpoint identifiers and data transmitted over network 160 or another communication channel. Client device 110 may also include authentication tokens for authenticating a user during audio communications, which may include partial token data from multiple token service providers and algorithms or processes to generate an authentication token from partial token data.

Client device 110 includes at least one network interface component 118 adapted to communicate with IVR system 130, external token provider 140, and/or external token provider 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

IVR system 130 may be maintained, for example, by a service provider, which may provide audio communications to users through voice or audio data transfers between two or more endpoints. In this regard, IVR system 130 includes one or more processing applications which may be configured to interact with client device 110, external token provider 140, and/or external token provider 150 to establish a voice or audio data transfer, which may be between client device 110 and an endpoint device or server of IVR system 130. The data transfer may be used to interact with an automated system, such as an IVR interface (e.g., audio interface) that allows a user to interact with a service provider or other entity associated with IVR system 130 using voice or audio data transfers. The automated system may provide access and/or use of accounts or sensitive data, and therefore require authentication of a user. Authentication may be performed using a biometric as discussed herein, where IVR system 130 may interact with external token providers 140 and 150 to perform authentication by determining if a received authentication token during the voice data transfer matches token data generated or determined by external token providers 140 and 150 for the authentication request during the voice data transfer. In one example, IVR system 130 may be provided by PAYPAL®, Inc. of San Jose, Calif., USA. However, in other embodiments, IVR system 130 may be maintained by or include another type of service provider, which may provide voice or audio connection services to a plurality of users.

External token providers 140 and 150 may be maintained, for example, by one or more token service providers, which may provide tokenization processes and authentication through the use of tokens that identify a user, voice data transfer instance, and/or biometric. In this regard, external token providers 140 and 150 includes one or more processing applications which may be configured to interact with client device 110 and IVR system 130 to facilitate authentication of a user by providing authentication token data, such as an authentication token or partial data of the authentication token, in response to entry of a biometric to client device 110 during a voice data transfer between client device 110 and IVR system 130. In one example, external token providers 140 and 150 may be provided by PAYPAL®, Inc. of San Jose, Calif., USA or other service providers that provide tokenization services. However, in other embodiments, external token providers 140 and 150 may be maintained by or include another type of service provider, which may provide tokenization and authentication services.

External token providers 140 and 150 of FIG. 1 contain respective token acquisition applications 142 and 152, other applications 144 and 154, databases 146 and 156, and network interface components 148 and 158. Token acquisition application 142/152 and other applications 144/154 may correspond to executable processes, procedures, and/or applications with associated hardware. In other embodiments, External token providers 140 and 150 may include additional or different modules having specialized hardware and/or software as required.

Token acquisition applications 142 and 152 may correspond to one or more processes to execute modules and associated specialized hardware of external token providers 140 and 150 that provides authentication processes using data tokens during voice data transfers between two or more endpoints, such as a voice, audio, and/or audiovisual data transfer between client device 110 and IVR system 130. In this regard, token acquisition applications 142 and 152 may correspond to specialized hardware and/or software of external token providers 140 and 150 to first receive a biometric or biometric feature data from client device 110 during the data transfer, which may be received in response to an authentication request during the data transfer. In response to the received biometric data, token acquisition applications 142 and 152 may generate or determine a respective token (e.g., through token creation or a database lookup using a database table or reference tool to determine a stored token). In some embodiments, only a single token may be determined using one of token acquisition applications 142 and 152, which may be provided in response to the biometric to client device 110. However, in other embodiments, both token acquisition applications 142 and 152 may respond with partial authentication token data to client device 110, such as an individual data token used to generate an authentication token for use during the voice data transfer. Client device 110 may then provide the authentication token during the voice data transfer. IVR system 130 may interact with token acquisition applications 142 and 152 to determine if the received authentication token matches the data token(s) provided by token acquisition applications 142 and 152 to client device 110, for example, by matching the authentication token or partial authentication token data (e.g., respective data tokens from token acquisition applications 142 and 152) and identifier for client device 110 to stored data token(s). If the data tokens match, token acquisition applications 142 and 152 may indicate that the user and/or client device 110 is authenticated and therefore trustworthy, which may increase or step-up authentication of the user and/or client device 110.

In various embodiments, external token providers 140 and 150 includes other applications 144 and 154 as may be desired in particular embodiments to provide features to external token providers 140 and 150. For example, other applications 144 and 154 may include security applications for implementing server-side security features, programmatic client applications for interfacing with appropriate application programming interfaces (APIs) over network 160, or other types of applications. Other applications 144 and 154 may include server interface applications for an online server platform that output data to one or more devices, such as data tokens and/or partial token data used for authentication processes using authentication tokens. For example, other applications 144 and 154 may contain software programs, executable by a processor, including a graphical user interface (GUI) configured to provide interface data for display on devices.

External token providers 140 and 150 may further include databases 146 and 156 stored in a transitory and/or non-transitory memory of external token providers 140 and 150, which may store various applications and data and be utilized during execution of various modules of external token providers 140 and 150. Databases 146 and 156 may include, for example, identifiers such as operating system registry entries, cookies associated with token acquisition applications 142/152 and/or other applications 144/154, identifiers associated with hardware of external token providers 140 and 150, or other appropriate identifiers, such as identifiers used for payment/user/device authentication or identification. In various embodiments, databases 146 and 156 may include data tokens used for authentication purposes, which may correspond to data that may be used to authenticate a user when the data is received from IVR system 130 and matched to the stored data tokens for a biometric, user, and/or voice data transfer instance. Databases 146 and 156 may also include biometrics and/or biometric feature data that is associated with stored data tokens used for authentication. Such biometrics and/or biometric feature data may be stored and/or referenced in database tables so that data tokens may be retrieved using a received biometric or biometric feature data during an authentication process.

External token providers 140 and 150 include at least one network interface components 148 and 158 adapted to communicate with client device 110 and/or IVR system 130 over network 160. In various embodiments, network interface components 148 and 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2A:
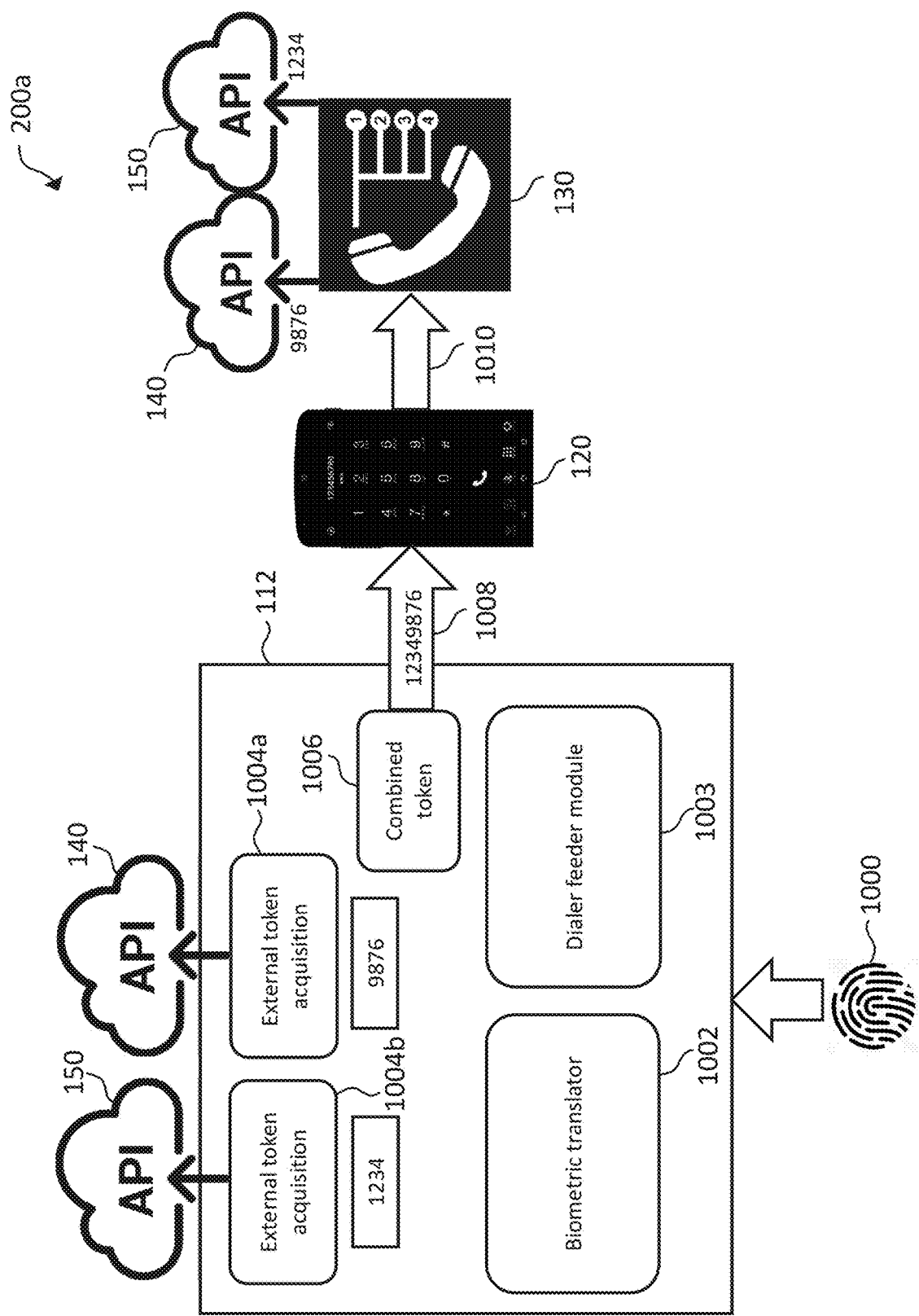
FIG. 2A is an exemplary system environment showing conversion of a fingerprint to an authentication token used during a voice data transfer, according to an embodiment.

FIG. 2A is an exemplary system environment showing conversion of a fingerprint to an authentication token used during a voice data transfer, according to an embodiment. FIG. 2A includes IVR system 130, external token provider 140, and external token provider 150 discussed in reference to system 100 of FIG. 1.

In environment 200a, a client device, such as client device 110 in system 100, interacts with IVR system 130 using authentication application 112 and voice data application 120 to perform biometric authentication during a voice data transfer between the client device and IVR system 130. Authentication application 112 and voice data application 120 are discussed in reference to system 100. For example, a phone call by the client device to IVR system 130 may be established by entering an identifier for IVR system 130 and requesting data communications with IVR system 130 over a communication channel. Once established, IVR system 130 may require authentication of the user using the client device. The authentication may be required at the beginning of the phone call or during the phone call, such as at a point when navigating menus or other IVR interfaces. This may be done by entering or otherwise providing a biometric to the client device. For example, the user has a fingerprint 1000 scanned by the client device, which is processed by authentication application 112 and voice data application 120 to authenticate the user to IVR system 130.

Authentication application 112 may request entry of fingerprint 1000 through an interface, request output, and/or biometric input component of the client device. Authentication application 112 may then process fingerprint 1000 using a biometric translator 1002, which may correspond to an executable process to determine authentication token 1006. In some embodiments, biometric translator 1002 may generate fingerprint feature or raw data for fingerprint 1000 based on lines, contours, and other shapes, points, or features within fingerprint 1000. The feature data may then be used to retrieve partial data tokens from external token providers 140 and 150 used to generate a combined token for an authentication token 1006 by combining the data tokens or mashing up the tokens using an algorithm. However, in other embodiments, biometric translator 1002 may directly provide fingerprint 1000 to external token providers 140 and 150, which may convert the data to feature data and then determine the partial data tokens.

Thus, biometric translator 1002 may provide fingerprint 1000 or the feature data of fingerprint 1000 to external APIs of external token providers 140 and 150, which utilize respective token databases of external token providers 140 and 150 to retrieve, generate, or determine the partial data tokens. Biometric translator 1002 utilizes an external token acquisition process 1004a associated with external token provider 140 and an external token acquisition process 1004b associated with external token provider 150 to interface with the external APIs of external token providers 140 and 150. External token providers 140 and 150 may then respond to authentication application 112 with the partial data tokens. For example, external token provider 140 provides back "9876" as the digits of a data token having partial data for authentication token 1006 through the external API of token service provider 140 interfacing with external token acquisition process 1004a. Similarly, external token provider 150 responds with "1234" through the external API interfacing with external token acquisition process 1004b. Authentication application 112 then generates authentication token 1006 by combining or executing an algorithm to combine in a particular manner, "9876" and "1234." As such, authentication token 1006 may correspond to "12349876" as a full data token used for authentication, or another token may be calculated as required by authentication application 112.

Authentication application 112 then interfaces with voice data application 120 to provide authentication token 1006 to IVR system 130 during the voice data communications. For example, authentication application 112 may utilize a dialer feeder module 1003 to type, enter, or input "12349876" to a dialer module or component of voice data application 120 through an application interface 1008. Dialer feeder module 1003 may therefore cause authentication token 1006 to be dialed or relayed during the voice data transfer to IVR system 130 through application interface 1008 between authentication application 112 and voice data application 120. In other embodiments, another communication channel may be used to send authentication token 1006 to IVR system 130, such as a separate network channel. Voice data application 120 therefore provides or communicates authentication token 1006 to IVR system 130 over data communications 1010. In order to then authenticate the user, IVR system interfaces with external token providers 140 and 150 to confirm that authentication token 1006 is valid. For example, IVR system 130 may check that "9876" was provided to or identifies the user with external token provider 140 and may also confirm if "1234" corresponds to the user with external token provider 150. If the data from authentication token is confirmed with external token providers 140 and 150, the user may be authenticated, and the user may then be stepped-up or otherwise trusted for additional processes, data access, or actions. However, if not, the user may be refused authentication, requested to be authenticated again or by other means, and the user may not have access to the additional features until authenticated.

Figure 2B:
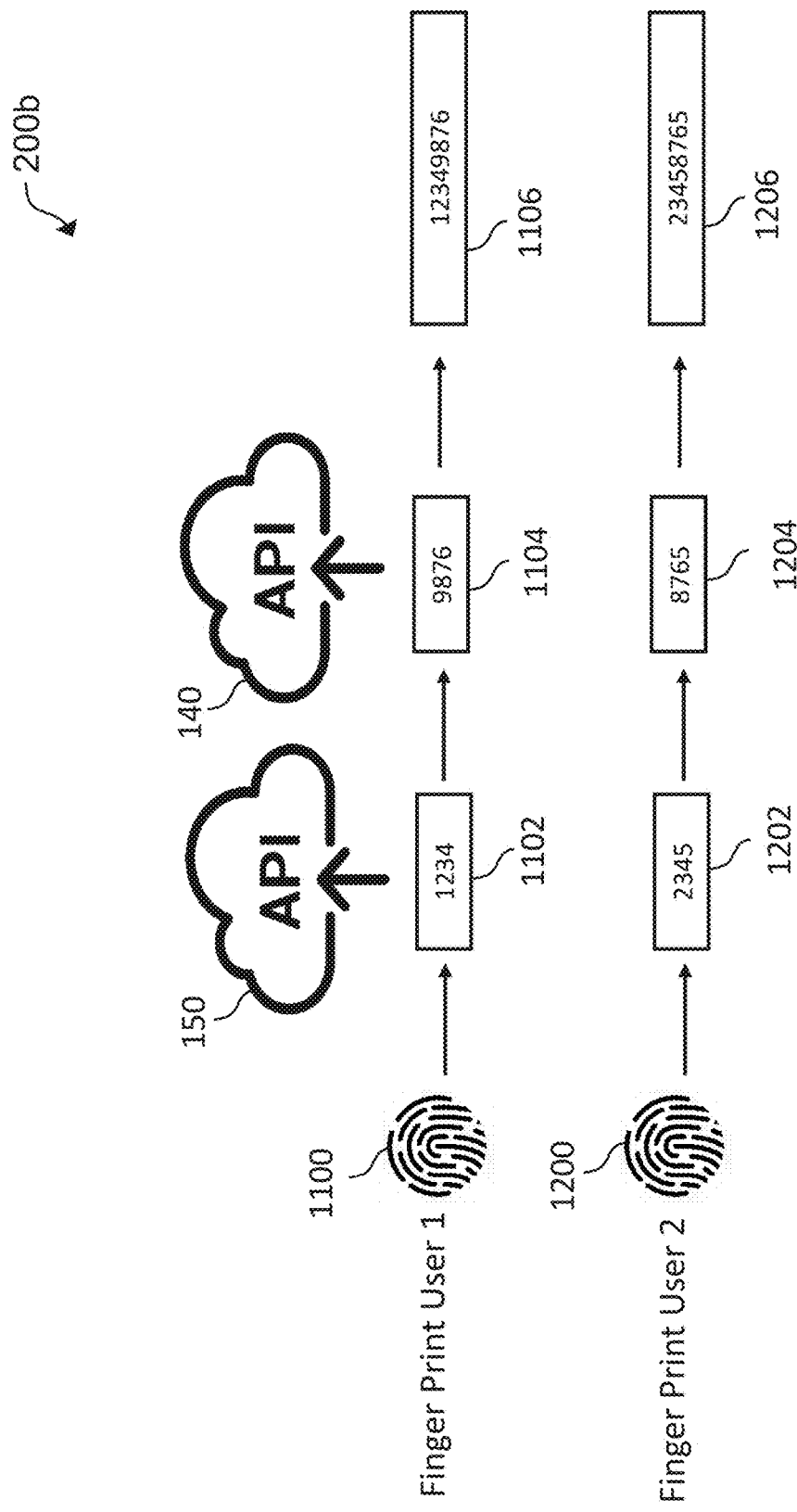
FIG. 2B are exemplary conversions of fingerprints into different authentication tokens using multiple token service providers, according to an embodiment.

FIG. 2B are exemplary conversions of fingerprints into different authentication tokens using multiple token service providers, according to an embodiment. Environment 200b shows how different fingerprints of different users may be translated to authentication tokens that are different and thereby allow external token providers 140 and 150 to authenticate multiple different users at a time to IVR systems. Environment 200b includes external token providers 140 and 150 discussed in reference to system 100 of FIG. 1.

A first user fingerprint 1100 may be fed to external token providers 140 and 150 in order to produce a first user authentication token 1106. External token providers 140 and 150 may each provide separate partial data for first user authentication token 1106. For example, external token provider 150 may provide "1234" for a first user partial data token A 1102 and external token provider 140 may provide "9876" for a first user partial data token B 1104. A process on a computing device, such as client device 110 may then convert first user partial data token A 1102 and first user partial data token B 1104 to first user authentication token 1106 using a combination process or mashup algorithm, for example, by generating "12349876" as the digits of the authentication token. As noted, data from the partial data tokens, they can be combined in any way and do not need to be appended in whole. For example, the data may be partitioned, interleaved, scrambled, mapped to a look-up table, etc.

In a similar fashion, another computing device may also receive input of second user fingerprint 1200, which may be converted to feature or raw data used with external token providers 140 and 150 to generate a second user authentication token 1206. External token providers 140 and 150 may utilize the fingerprint feature data of second user fingerprint 1200 to return a second user partial data token A 1202 having "2345" as the digits or data of the token and a second user partial data token B 1204 having "8765" as the data of the token. The second user's computing device may generate second user authentication token 1206 having a combination of second user partial data token A 1202 and second user partial data token B 1204, such as "23458765." First user authentication token 1106 and second user authentication token 1206 each uniquely identify the first user and the second user, respectively, and therefore may be used to authenticate the first user and the second user during voice data transfers. First user authentication token 1106 and second user authentication token 1206 may therefore be fed to one or more IVR systems through a dialer or other communication channel or module, which may authenticate the first user and the second user, respectively, through external token providers 140 and 150.

Figure 3:
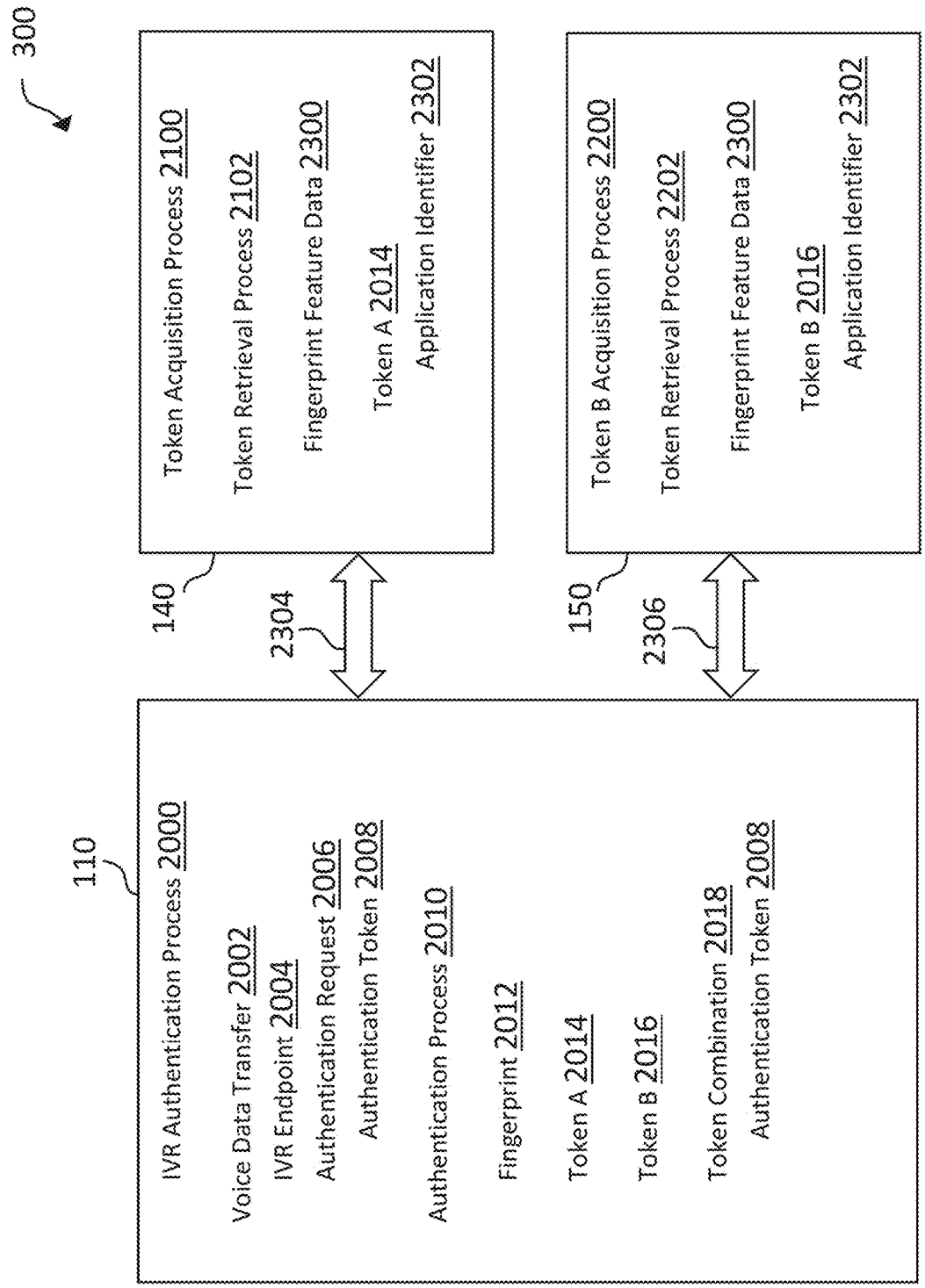
FIG. 3 is an exemplary system environment where a user device and two token service providers may interact to convert a fingerprint or other biometric into an authentication token for authentication during a voice data transfer, according to an embodiment.

FIG. 3 is an exemplary system environment where a user device and two token service providers may interact to convert a fingerprint or other biometric into an authentication token for authentication during a voice data transfer, according to an embodiment. FIG. 3 includes client device 110, external token provider 140 and external token provider 150 discussed in reference to system 100 of FIG. 1.

In environment 300, client device 110 executes one or more applications for biometric authentication during voice or audio communications or data transfers, for example, the applications and processes discussed in reference to client device 110 in system 100 of FIG. 1. In this regard, an IVR authentication process 2000 may be provided by the client device's applications and processes, which is used to authenticate a user during a data transfer using a biometric. IVR authentication process 2000 detects a voice data transfer 2002 with an IVR endpoint 2004. During voice data transfer 2002, an authentication request 2006 is detected or received, for example, at the start of voice data transfer 2002 or during navigation of IVR interfaces. In order to respond to authentication request 2006, an authentication token 2008 is required to be provided during voice data transfer 2002.

In order to determine authentication token 2008, an authentication process 2010 is performed by client device 110 with external token providers 140 and 150. Authentication process 2010 receives a fingerprint 2012 or other biometric during voice data transfer 2002, which may be sensed using an input component of client device 110. In response to entry of fingerprint 2012, client device 110 interacts with external token providers 140 and 150 through data communication 2304 and data communication 2306, respectively. For example, client device 110 may interface with an external API of external token provider 140 through data communication 2304 to request a token A 2014 corresponding to partial data of authentication token 2008. External token provider 140 then performs token retrieval process 2012 to process fingerprint feature data 2300 of fingerprint 2012. Token A 2014 is generated or determined through database reference tables, and token A 2014 is provided to client device 110 using application identifier 2302 or another identifier for client device 110. Token A 2014 is also associated with application identifier 2302 to provide authentication and identification services.

Similarly, client device 110 interfaces with an external API of external token provider 150 through data communication 2306 to request a token B 2016 corresponding to partial data of authentication token 2008. External token provider 150 executes a token retrieval process 2202 to process fingerprint feature data 2300 and generate or determine token B 2016. Token B 2016 is also associated with application identifier 2302 and sent to client device 110 using application identifier 2302 and/or another identifier. Once token A 2014 and token B 2016 are received by client device 110, a token combination 2018 is used to generate authentication token 2008 from token A 2014 and token B 2016.

Figure 4:
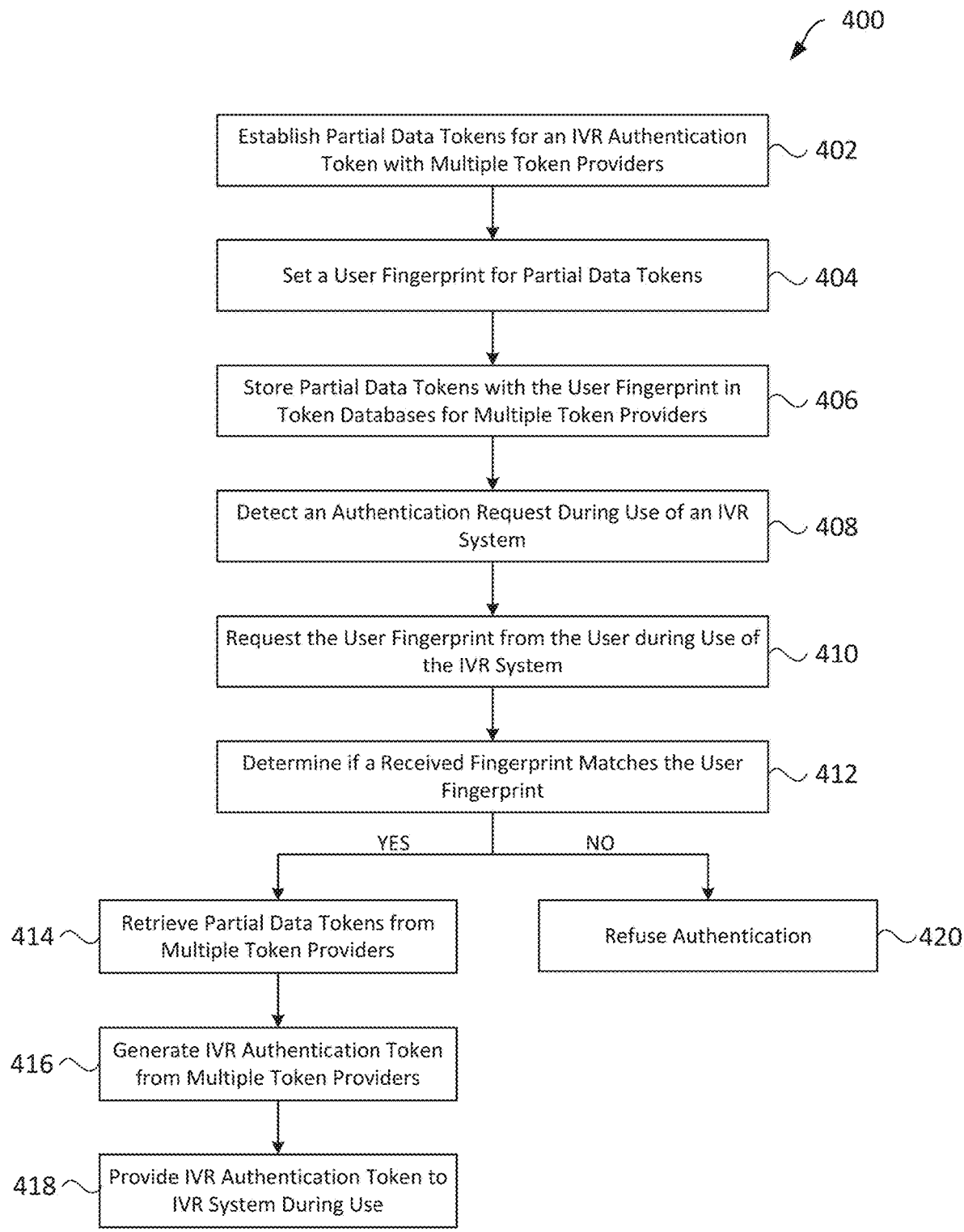
FIG. 4 is an exemplary flowchart for biometric authentication during voice data transfers, according to an embodiment.

FIG. 4 is an exemplary flowchart for biometric authentication during voice data transfers, according to an embodiment. Note that one or more steps, processes, and methods described herein of flowchart 400 may be omitted, performed in a different sequence, or combined as desired or appropriate.

At step 402 of flowchart 400, partial data tokens for an IVR authentication token are established with multiple token providers. A user, client device, and/or authentication application on the client device may register with a service provider and/or multiple token service providers that create an authentication token or partial data tokens used in a combination as the authentication token. Thus, the multiple token providers may generate data token(s) for the user. However, in other embodiments, the user and/or client device may merely be registered with the multiple token providers, which may generate the partial data tokens for the IVR authentication token periodically or at the time of an authentication in order to reduce risk of compromise of token data and use fresh or changing token data to increase security and reduce malicious attacks. Once token data is established and/or the user is registered with the multiple token providers, a user fingerprint or other biometric is set for the partial data tokens, at step 404. In some embodiments where token data is variable and generated later, the user fingerprint or other biometric is instead stored for the user with an identifier for the user, client device, and/or application on the client device.

Partial data tokens and/or the user fingerprint (or other biometric) is then stored in token databases for the multiple token providers, at step 406. The token databases may include referential tables that allow for determination of partial data tokens using the token databases. After registering with the multiple token providers, at step 408, an authentication request is detected during use of an IVR system. For example, the authentication request may occur at the initial start of communications between endpoint devices or based on a navigation or action taken during the communications. The client device needing authentication may therefore detect the authentication request, and in response to the authentication request, the client device requests the user fingerprint from the user during use of the IVR system, at step 410. This may be performed by outputting a request for a fingerprint or other biometric through an interface of the user device and/or using a component of the user device. Additionally, a sensor or other detector may be activated to input or detect the biometric.

At step 412, a received fingerprint is matched to the user fingerprint previously set for data tokens at step 404. This may include converting a received fingerprint to raw or feature data of the fingerprint so that the feature data may be compared to stored fingerprint features. If the user's fingerprint does match, then at step 414 partial data tokens are retrieved from multiple token providers. This may include looking up or generating the partial data tokens based on the user fingerprint and/or authentication request with the multiple token providers. For example, one or more external APIs of the token provider(s) may be interacted with by the user's client device, which may refer to token generators and/or databases for the tokens. The IVR authentication token is then generated using the partial data tokens, at step 416. The IVR authentication token may be generated by mashing up or combining the partial data tokens in a manner known to the client device, IVR system, and/or multiple token providers. The IVR authentication token is then provided to the IVR system, at step 418, which occurs during use of the IVR system by the user's client device. Thus, the user may be authenticated. However, if the fingerprint received at step 412 does not match any stored fingerprint data, then the user is refused authentication, at step 420.

As such, biometric authentication during voice data transfers may provide solutions to issues with user authentication and identification that normally occur with the use of dialer modules and components. Biometric authentication provides further security to user authentication, which normally would not be capable of being processed over voice or sound data communications. Moreover, by utilizing multiple service providers, issues and problems in database compromise of one service or token provider may further be alleviated. This allows devices and voice communication systems (e.g., IVR systems) to be further assured of user identity and authentication when remote or disparate data endpoints are involved in data transfers and sensitive data processing.

Figure 5:
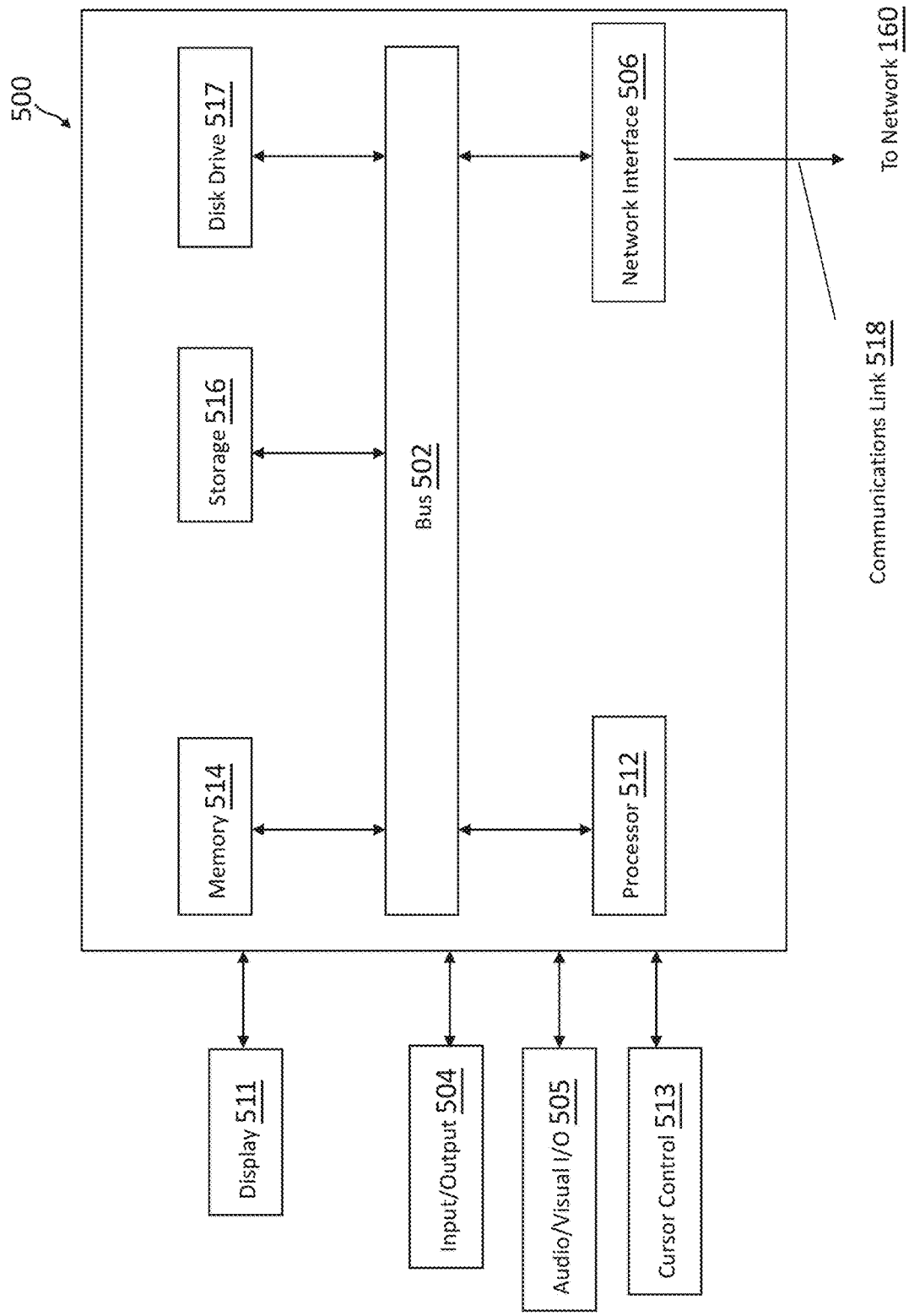
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computing device system, comprising:
a non-transitory memory storing instructions; and
one or more hardware processors coupled to the non-transitory memory and configured to read the instructions from the non-transitory memory to cause the computing device system to perform operations comprising:
receiving a biometric input from a user during a voice data communication session with an interactive voice communication system;
determining an authentication token with an external application programming interface (API) based on the biometric input, wherein the external API is associated with a plurality of token acquisition databases storing a portion of the authentication token;
determining a transmission process available to the computing device system and the interactive voice communication system for relaying the authentication token during the voice data communication session;
converting the authentication token to a token capable of being transmitted by the computing device system to the voice communication system during the voice data communication session;
providing the token to the interactive voice communication system during the voice data communication session via the transmission process; and enabling an account functionality associated with the user based on the provided token.

2. The computing device system of claim 1, wherein the external API comprises a first external API and a second external API, wherein the plurality of token acquisition databases comprise a first token acquisition database associated with the first external API and a second token acquisition database associated with the second external API, wherein the biometric input comprises a fingerprint, and wherein the determining the authentication token comprises:
receiving a first partial token from the first token acquisition database through the first external API; and
receiving a second partial token from the second token acquisition database through the second external API, wherein the authentication token comprises a combination of the first partial token and the second partial token.

3. The computing device system of claim 2, wherein prior to determining the authentication token, the operations further comprise:
converting the fingerprint to biometric feature data using a resident application on the computing device system; and
in response to the converting, transmitting the biometric feature data to the first external API and the second external API, wherein the first partial token and the second partial token are received based on the biometric feature data.

4. The computing device system of claim 2, wherein the operations further comprise:
transmitting the fingerprint to the first external API and the second external API using a resident application on the computing device system, wherein receiving the first partial token and receiving the second partial token are in response to the transmitting.

5. The computing device system of claim 1, wherein prior to receiving the biometric input, the operations further comprise:
determining that the biometric input is required during the voice data communication session using a resident application on the computing device system; and
requesting the biometric input from the user through the resident application.

6. The computing device system of claim 5, wherein determining that the biometric input is required comprises one of:
initiating the voice data communication session;
receiving an incoming request for the biometric input; or
detecting the incoming request for the authentication token during the voice data communication session.

7. The computing device system of claim 1, wherein providing the authentication token during the voice data communication session comprises outputting the authentication token through a phone number dialer using the transmission process to the voice communication system.

8. The computing device system of claim 1, wherein prior to receiving the biometric input, the operations further comprise:
receiving, from the user, a request to establish the authentication token with a service provider associated with the external API;
receiving the biometric input from the user; and
transmitting the request and the biometric input to the service provider.

9. The computing device system of claim 8, wherein the operations further comprise:

receiving a confirmation of a generation or a partial generation of the authentication token from the service provider.

10. The computing device system of claim 1, wherein the transmission process is provided using one of an authentication application associated with the API, a voice data communication application performing the voice data communication session, or a third-party application integrated with the voice data communication application.

11. The computing device system of claim 1, wherein the biometric input comprises one of a fingerprint, a face image, voice data, or retinal data.

12. A method comprising:
receiving, by a first service provider from a mobile device of a user, a token request associated with an authentication during a phone call session with an interactive voice response (IVR) endpoint, wherein the token request comprises data based on a fingerprint of the user;
determining, by the first service provider, a first token stored in a token database of the first service provider based on the token request;
determining a transmission process available to the mobile device for relaying the first token to the IVR endpoint during the phone call session;
converting the first token to a token capable of being transmitted by the mobile device to the IVR endpoint during the phone call session;
transmitting, by the first service provider via the transmission process, the token to an authentication application on the mobile device during the phone call session with the IVR endpoint; and
enabling an account functionality associated with the user based on the transmitted token.

13. The method of claim 12, wherein the first token is associated with a second token stored by a second service provider, and wherein the first token comprises partial data of an authentication token used for the authentication during the phone call session.

14. The method of claim 13, wherein the authentication token comprises a data combination of the first token and the second token.

15. The method of claim 13, wherein the data for the token request comprises feature data converted from the fingerprint, and wherein the first token is determined based on the feature data.

16. The method of claim 13, wherein the data for the token request comprises data from the fingerprint, and wherein determining the first token comprises converting the data to feature data of the fingerprint and determining the first token using the feature data.

17. The method of claim 12, wherein the token request is received through one of the authentication application or a voice data transfer application on the mobile device.

18. A non-transitory machine-readable medium having stored thereon machine-readable instructions executable to cause a machine to perform operations comprising:
receiving, by a first service provider, fingerprint data of a user from a computing device of the user;
generating, by the first service provider, a first token based on the fingerprint data, wherein the first token comprises first partial data for an interactive voice response (IVR) authentication token;
storing the first token in a token database of the first service provider, wherein the first token is associated with the fingerprint data in a token retrieval table in the token database;

determining a transmission process available to the computing device for relaying the first token to an IVR authentication process;

converting the first token to a token capable of being transmitted by the computing device to the IVR authentication process;

providing the token to at least the computing device during the IVR authentication process; and enabling an account functionality associated with the user based on the provided token.

19. The non-transitory machine-readable medium of claim 18, wherein the first token is associated with a second token with a second token provider, and wherein the second token comprises second partial data for the IVR authentication token.

20. The non-transitory machine-readable medium of claim 18, wherein the operations further comprise:

receiving the fingerprint data from the computing device during the IVR authentication process; and determining the first token based on the fingerprint data.

* * * * *